Dec. 2, 1941.     L. F. HATCH     2,264,878
SEPARATION OF GASEOUS MIXTURES
Filed June 8, 1940
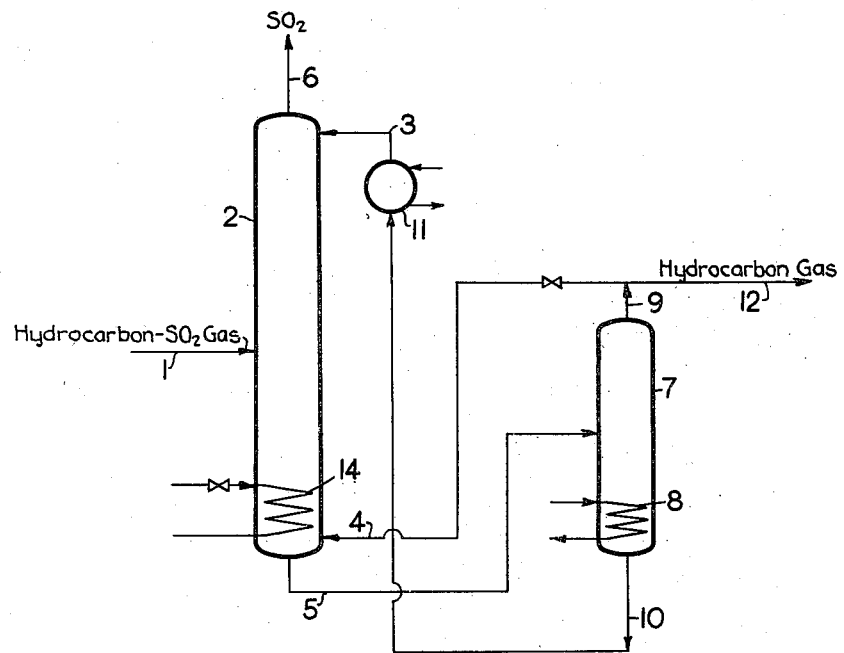
Inventor: Lewis F. Hatch
By his Attorney:

Patented Dec. 2, 1941

2,264,878

UNITED STATES PATENT OFFICE 2,264,878

SEPARATION OF GASEOUS MIXTURES

Lewis F. Hatch, Berkeley, Calif., assignor to Shell Development Company, San Francisco, Calif., a corporation of Delaware Application June 8, 1940, Serial No. 339,507

8 Claims. (Cl. 183—115)

This invention deals with the separation of normally gaseous mixtures, a portion only of which consists of hydrocarbons, and more particularly deals with a method for separating normally gaseous mixtures of hydrocarbons and $SO_2$ by scrubbing them with a normally liquid hydrocarbon oil.

It is a purpose of this invention to provide a simple and economical process for separating mixtures of hydrocarbon gases with $SO_2$. It is another purpose to separate such mixtures into two fractions, one of which consists essentially of hydrocarbons and the other of $SO_2$.

It is known to remove $SO_2$ impurities from hydrocarbon gases by various means. Thus they may be removed by scrubbing with basic-reacting liquids or water, or polar organic solvents, whereby the $SO_2$ is preferentially dissolved. Moreover, $SO_2$ has been separated from combustion gases of sulfur ore by absorption in kerosene, etc. Separation of the $SO_2$ from hydrocarbon gases, particularly from those containing $C_3$—$C_5$ hydrocarbons by simple distillation is not feasible, however, because of the formation of azeotropic mixtures.

I have discovered that gaseous mixtures of hydrocarbons containing substantial portions of $SO_2$ can effectively be separated to produce on the one hand a hydrocarbon fraction and, on the other hand, $SO_2$ by scrubbing the mixture with a normally liquid hydrocarbon oil, whereby at least a portion of the gaseous hydrocarbons is dissolved in the hydrocarbon oil and a residual gas of enriched $SO_2$ content is produced. A fat hydrocarbon liquid containing dissolved hydrocarbon gases is thus formed, which liquid is then distilled to produce hydrocarbon gases relatively free of $SO_2$, and the resulting lean hydrocarbon oil is returned to the scrubbing zone to separate additional quantities of the gas mixture.

Ordinary scrubbing may be employed if the separation does not have to be very sharp. However, ordinarily I prefer extractive distillation or vapor phase extraction in two zones, a scrubbing zone wherein hydrocarbon gases, together with a small portion of the $SO_2$, are absorbed in the absorption oil, and a rectifying zone, wherein absorbed $SO_2$ is stripped out from the resulting fat oil by contact with substantially pure hydrocarbon gases. The vapor phase extraction may be carried out isothermally or adiabatically.

The temperatures and pressures maintained during the vapor phase extraction or equivalent operation may be varied over fairly wide limits, the principal limitation being to carry out the treatment at a temperature substantially higher than the bubble point of the gas mixture. Thus I may in most instances carry out my separation conveniently at about room temperature and at substantially atmospheric or higher pressures.

The hydrocarbon oil employed in the scrubbing must have a boiling temperature sufficiently high to avoid undue losses by vaporization in the contact zone. Thus it should have an initial boiling point not below about 50° C. On the other hand, it is desirable that its molecular weight be as low as possible and as is compatible with the minimum requirement for boiling temperature. It must be stable under the conditions of the process, and it is desirable that it possess a fairly high Watson characterization factor, i. e., preferably above about 11.5. This factor, as is known, is an indication of the paraffinicity of hydrocarbon oils and is described in Ind. Eng. Chem., vol. 27 (1935), pages 1460–1464.

Suitable absorption oils are relatively high-boiling naphthas, kerosene and gas oils, preferably from paraffinic crudes, kerosene raffinates, alkylates of olefines or cracked naphthas, cracked and hydrogenated hydrocarbon oils, liquid hydrocarbon polymers, preferably hydrogenated, pure hydrocarbons such as hexanes, i. e., normal hexane, neohexane, cyclohexane; heptanes, octanes, such as isooctanes, nonanes, decanes, cetanes, etc. If desired, however, aromatic hydrocarbon oils may also be used, although their efficacy for my purpose is much below that of the paraffinic hydrocarbon oils.

The amount of hydrocarbon oil used to contact the gas should be at least sufficient to dissolve substantially all of the hydrocarbon gas under the conditions of the treatment if a more or less complete separation is desired.

Gases to which my process is particularly applicable are those having a relatively high content of $SO_2$, i. e., about 10% or more. Such mixtures are obtained, for example, in the separation of diolefines from cracked hydrocarbon gases by reaction with $SO_2$ to form sulfones and an unreacted $SO_2$–hydrocarbon residue gas. Furthermore, the process is most efficient when applied to mixtures consisting essentially of $SO_2$ and $C_3$—$C_5$ hydrocarbons.

Because of its simplicity, my process may be employed as a preliminary treatment followed by some other method of separation either physical or chemical, if end products of extreme purity are required. In most cases, however, the separation which can be achieved by my process alone is sufficient.

The effectiveness of my process is well illustrated by the fact that the relative volatility of $C_4$ hydrocarbons against $SO_2$ in the presence of isooctane at normal room temperature is about 1:3, relative volatility being defined as $$\alpha = \frac{P_1}{X_1} \bigg/ \frac{P_2}{X_2}$$

wherein $P_2$=partial pressure of the $C_4$ hydrocarbons, $P_2$=partial pressure of the $SO_2$, $X_1$=mol fraction of $C_4$ hydrocarbons in the isooctane solution, and $X_2$=mol fraction of the $SO_2$ in the isooctane solution.

My invention is fully understood from the accompanying drawing which represents a simplified flow diagram of my process.

A gas mixture to be separated such as a mixture consisting of $SO_2$ and $C_4$ hydrocarbons is introduced through line 1 into a contact column 2 at a point intermediate between its top and bottom. Into the top of column 2 a hydrocarbon absorption oil such as isooctane is introduced through line 3. This oil flows downward through the column in countercurrent to the ascending gas mixture. Into the bottom of column 2 through line 4 substantially pure $C_4$ hydrocarbon gases are injected which rise through the lower portion of the column in countercurrent to the descending absorption oil. These $C_4$ gases strip from the descending absorption oil small amounts of $SO_2$ dissolved therein. The resulting fat absorption oil rich in absorbed $C_4$ hydrocarbons is withdrawn from the bottom of column 2 through line 5, while unabsorbed $SO_2$ emerges from the top of the column through line 6.

The fat absorption oil is transferred to fractionation column 7 equipped with reboiler 8 at its bottom wherein it is distilled to remove absorbed hydrocarbon gas which emerges from column 7 through vapor line 9. Resulting lean solvent passes through bottom line 10 to cooler 11 to be returned to the top of contact column 2 through line 3.

The hydrocarbon vapor in line 9 is divided into two portions, a relatively small portion which is returned through line 4 to the bottom of column 2 to act as a stripping agent for the removal of absorbed $SO_2$ from the solvent as described, and a relatively large portion which passes through line 12 to storage, not shown.

Column 2 may be equipped with reboiler 14 and may thus be operated as a distillation column down which the hydrocarbon oil flows. If column 2 is operated in this manner, then the feed entering through line 1 may be liquid and is vaporized in the column. Care must be taken, however, that the temperature at the bottom of column 2 is not so high as to cause complete vaporization of the solute.

In the above flow diagram, auxiliary equipment such as heat exchangers, by-passes, valves, pumps, etc., are not shown. The use of such equipment is obvious to those skilled in the art.

I claim as my invention:

1. In a process for separating a normally gaseous hydrocarbon mixture containing a substantial amount of $SO_2$ to produce separate hydrocarbon and $SO_2$ fractions, the steps comprising contacting said gaseous mixture with an amount of a liquid hydrocarbon oil sufficient to dissolve at least a major portion of said hydrocarbon components and to produce a residual gas, and separating the resulting fat oil from the latter.

2. The process of claim 1 wherein the gas mixture contains at least 10% $SO_2$.

3. The process of claim 1 wherein the hydrocarbon oil has a Watson characterization factor above about 11.5.

4. The process of claim 1 wherein the hydrocarbon oil is a naphtha having an initial boiling point not below 50° C.

5. In a process for separating a gaseous mixture consisting essentially of $C_3$—$C_5$ hydrocarbons and $SO_2$ to produce separate hydrocarbon and $SO_2$ fractions, the steps comprising contacting said gaseous mixture with an amount of a liquid hydrocarbon oil sufficient to dissolve the major portion of said hydrocarbons and to produce a residual gas comprising $SO_2$, and separating the resulting fat hydrocarbon oil from the latter.

6. The process of claim 5 wherein said hydrocarbon oil is isooctane.

7. The process of claim 5 wherein said gaseous mixture consists essentially of $C_4$ hydrocarbons and $SO_2$.

8. In a process for separating a normally gaseous hydrocarbon mixture containing a substantial amount of $SO_2$ to produce separate hydrocarbon and $SO_2$ fractions, the steps comprising fractionating said gaseous mixture in a distillation zone down which a liquid hydrocarbon oil flows in an amount sufficient to dissolve at least a major portion of said hydrocarbons and to produce a residual gas, and separately withdrawing the resulting fat hydrocarbon liquid and said residual gas from said distillation zone.

LEWIS F. HATCH.